United States Patent [19]
Patrick

[11] Patent Number: 5,232,237
[45] Date of Patent: Aug. 3, 1993

[54] BICYCLE FRONT FORK PROTECTOR

[76] Inventor: Avery R. Patrick, 1529 Spruce St., Apt. #1E, Philadelphia, Pa. 19102

[21] Appl. No.: 713,747

[22] Filed: Jun. 11, 1991

[51] Int. Cl.5 .............................................. B62H 1/00
[52] U.S. Cl. ................................................... 280/293
[58] Field of Search ............... 280/293, 298, 301, 302, 280/303, 279; 248/230, 188.8

[56] References Cited

U.S. PATENT DOCUMENTS

| | | | |
|---|---|---|---|
| 485,285 | 11/1892 | Lewis | 280/302 |
| 611,709 | 10/1898 | Sapp | 280/293 |
| 617,028 | 1/1899 | Koehler | 280/303 |
| 672,401 | 4/1901 | Axel | 280/298 |
| 690,221 | 12/1901 | Arp et al. | 280/302 |
| 962,369 | 6/1910 | Lundstrom | 280/302 |
| 1,170,099 | 2/1916 | Pawsat | 280/302 |
| 2,509,937 | 5/1950 | Olson | 280/303 |
| 4,834,405 | 5/1989 | Dimaio | 280/301 |

*Primary Examiner*—Margaret A. Focarino
*Assistant Examiner*—Florian Zeender
*Attorney, Agent, or Firm*—Allan B. Osborne

[57] ABSTRACT

A protector (14) for preventing the front forks (12) of a bicycle (10) from resting on the ground (20) when the front wheel has been removed is disclosed. The protector (14) includes a bracket (26) for being attached to one fork (12), a shoe (30) for engaging the ground (20) and a link (28) attaching the shoe (30) to the bracket (26).

7 Claims, 2 Drawing Sheets

BICYCLE FRONT FORK PROTECTOR

FIELD OF THE INVENTION

The invention disclosed herein relates to a protector for use on a front fork of a bicycle when the front wheel is removed.

BACKGROUND OF THE INVENTION

It is well known that the sport of bicycling, including the use of bicycles for everyday transportation, is enjoying a substantial rise in popularity. Driving this phenomenon is the rising expense of using automobiles, including high parking costs, congestion on the highways and city streets, concerns of pollution and, last but not least, the ever important health benefits one obtains from riding a bicycle. As a result of the increase in popularity, manufacturers are producing better, more efficient, more versatile and, of course, more costly bicycles. As is also well known, bicycles are favorites of thieves for a number of reasons, one being the value thereof. To combat this problem, a quick-release front wheel was developed to enable the owner to lock the major components of the bicycle together into a compact package, with a short sturdy chain wrapped around a post or the like. The wheel is released by loosening the quick release nuts securing the wheel axle in the drop-out slots found in the free ends of each prong on the fork. Whereas this solution has proved very useful, it has been found that tips at the distal end of the front fork would become damaged through repeated and sometimes violent engagement with the ground, generally concrete. This problem has been attacked by one worker in the field who has proposed a fork protector adapted to be interposed between the front fork and the ground. The fork protector, disclosed in U.S. Pat. No. 4,925,204, comprises a plate having one edge for being received in the drop-out slots and a bottom edge for resting on the ground. Further, the bottom edge is curved so that the protector would tend to remain in the slots should the bicycle be tipped. A dense shock absorbing material attached to the bottom edge protects the plastic protector from being chipped. As an additional embodiment, the protector is provided with reflective material on the plate and means for attaching the protector to the spokes of the wheel for use during times when it is not being used as a fork protector.

Whereas the above described fork protector does provide protection to the fork, it has several disadvantages. First, it requires installing and removing from the fork end each time it is used. If not used as a reflective device, it must be stored somewhere else on the bicycle or on the rider during times the bicycle is being ridden. It is easily stolen if not chained to the front fork during use. It is also easily lost inadvertently.

Accordingly, it is now proposed to provide a protector permanently attached to the front fork which protects the ends of the fork when the front wheel is removed but does not have the above mentioned disadvantages.

SUMMARY OF THE INVENTION

According to the present invention, a protector for spacing the front forks of a bicycle above a ground when the front wheel has been removed is provided. The protector includes a shoe for engaging the ground, a bracket for being attached to one of the forks and a link connecting the shoe to the bracket.

DESCRIPTION OF THE INVENTION

Figure 1:
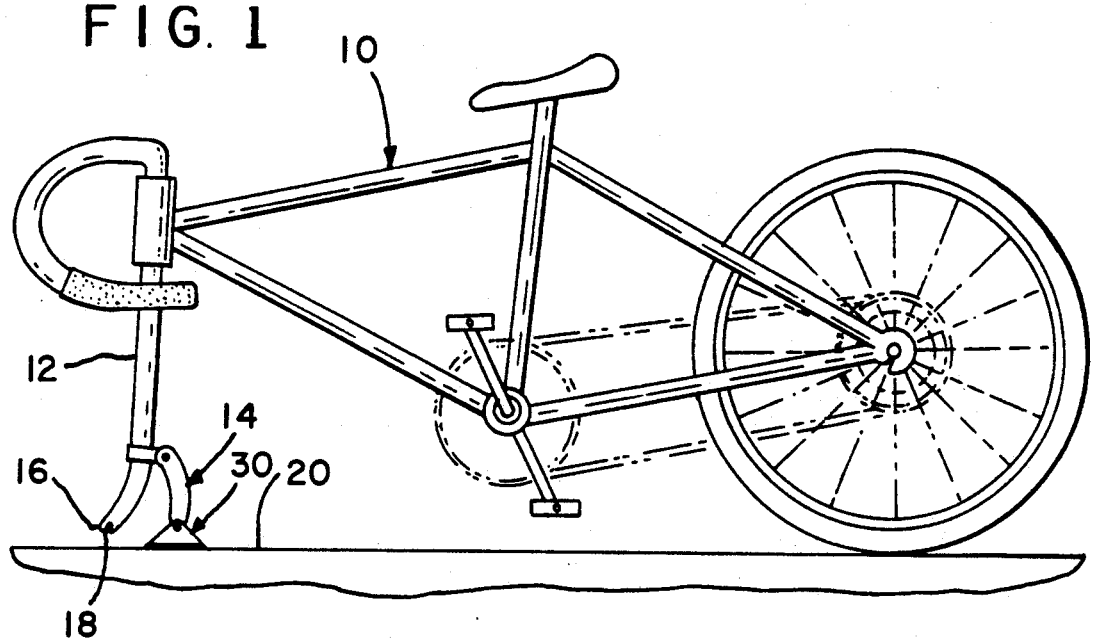
FIG. 1 is a side view of a bicycle with one embodiment of the present invention mounted thereon and in use as contemplated.

With reference to FIG. 1, the front wheel (not shown) has been removed from bicycle 10 and front forks 12 supported by protector 14 constructed in accordance with the present invention. protector 14 spaces fork tips 16, which define drop-out slots 18, above the surface 20 which generally is concrete. As will become apparent later on, protector 14 is fixed to one fork 12 and remains there even with the front wheel mounted in slots 18 and with bicycle 10 in use (not shown). Thus, an important advantage of the present invention is that stand 14 is a permanent part of bicycle 10 and the use thereof does not require daily assembly and disassembly.

Figure 2:
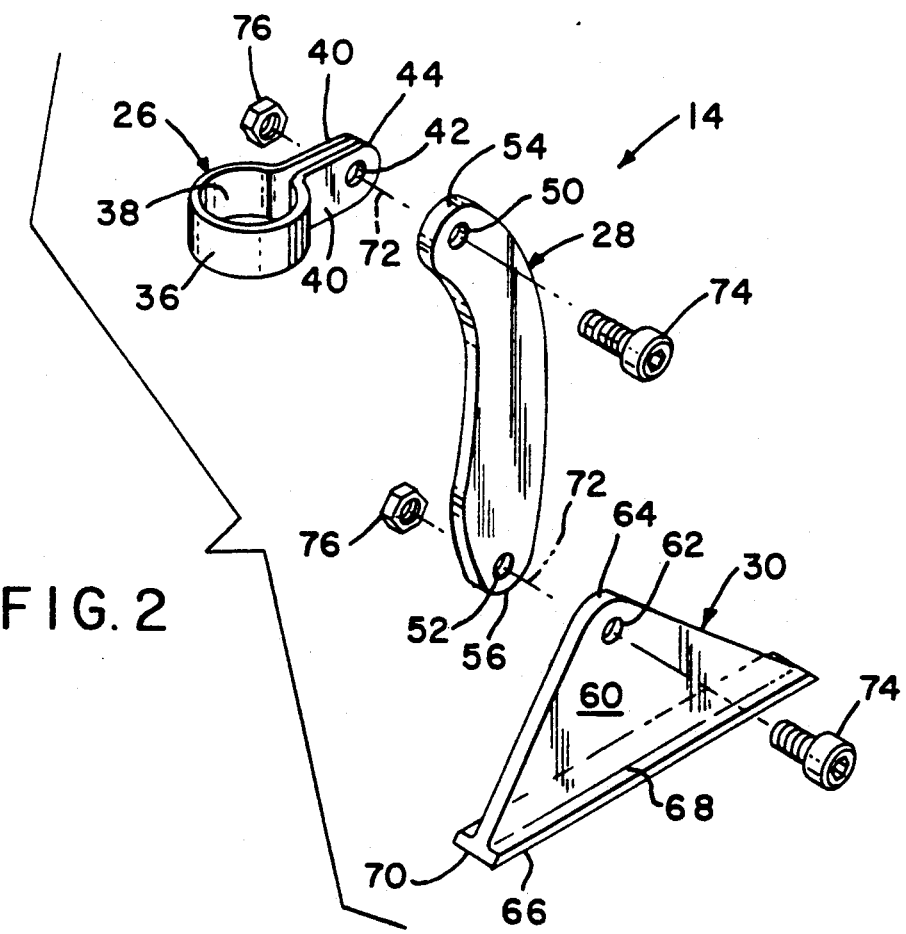
FIG. 2 is an exploded view of the one embodiment of the present invention.

The major components of one embodiment of protector 14 are shown in FIG. 2. They include bracket 26, link 28 and foot 30. Other components are bolts 32 and nuts 34.

Bracket 26 is a one-piece strap 36 formed to define an opening 38 and to provide a pair of parallel, side-by-side arms 40 extending outwardly. Preferably, opening 38 is shaped to reflect the shape of a fork 12 so as to fit therearound conformably. Aligned openings 42 extend through arms 40 adjacent free ends 44.

Link 28 is provided with holes 50,52 at respective free ends 54,56. Link 28 is shown to be curved near free end 54 but could be of some other configuration.

Foot 30 includes triangular shaped plate 60 with hole 62 therethrough adjacent apex 64 thereof. Flange 66 extends along base edge 68 of plate 60 and projects outwardly laterally from both sides to provide a flat surface 70 having a relatively large surface area.

As indicated by dashed lines 72, bolts 74 and nuts 76 secure the three components 26, 28 and 30 together.

Figure 3:
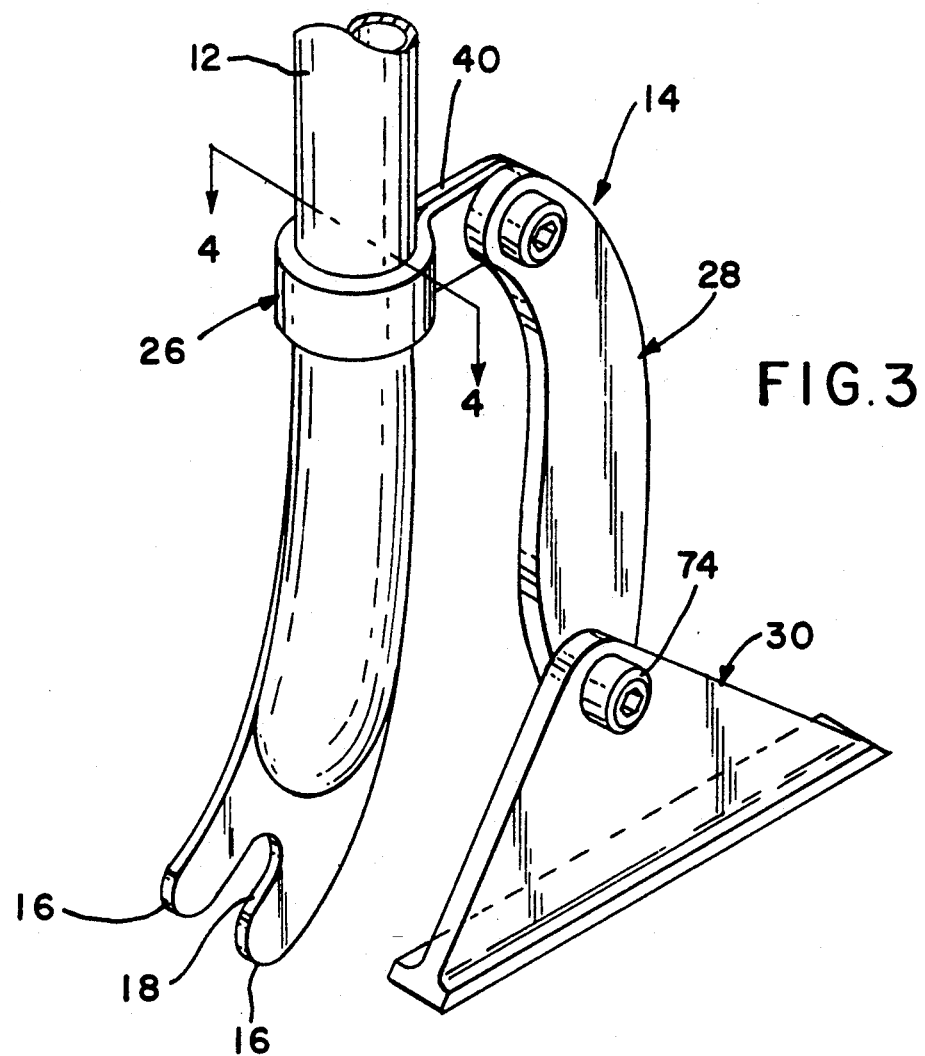
FIG. 3 is an enlarged view of the one embodiment mounted on the front fork of the bicycle.

FIG. 3 shows, in greater detail, protector 14 fixed to a fork 12 so that at least surface 70 of foot 30 extends below the lower most tip 16. FIG. 3 also shows the assembly of the three components 26, 28 and 30 to form protector 14. It is apparent that surface 70 is preferably parallel to the surface 20 (FIG. 1) upon which it rests. The use of fasteners such as bolts 74 and nuts 76 permits foot 30 to be angled as required to achieve the desired parallelism.

Figure 4:
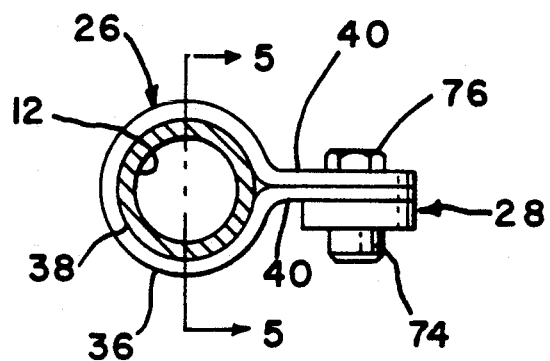
FIG. 4 is a sectional view taken along lines 4,4 in FIG. 3.

FIG. 4 illustrates how bracket 26 is conformally clamped to fork 12. As required, strap 36 is formed to define the shape of opening 38 to reflex the circumferential shapes of fork 12. Arms 40 can be made as long as is desired to provide sufficient room to adjust link 28. In this regard, link 28 may be straight or curved otherwise as is shown in the drawings.

Figure 5:
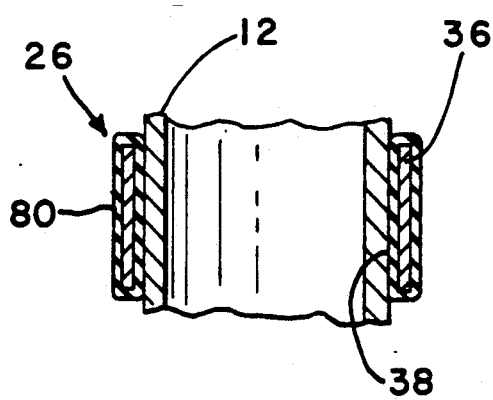
FIG. 5 is a sectional view taken along lines 5,5 in FIG. 4.

FIG. 5 is a sectioned view of bracket 26 taken across opening 38 to show that strap 36 may be made from a suitable metal; e.g., steel, and then coated, as indicated by reference numeral 80, with a suitable plastics material. Coating 80 both protects the finish of and increases the frictional grip about fork 12.

Protector 14 has been illustrated as comprising three major components; i.e. bracket 26, link 28 and shoe 30. However, it should be readily apparent, for example, that link 28 and shoe 30 could be made as just one component (not shown) with a single adjustment at bracket 26. Alternatively, protector 14 can be molded as a unitary article. Similarly foot 30 could be modified with respect to its overall shape and flange 66. Of course, care must be taken so that none of the structural features of protector 14 interfere with the front wheel when installed on bicycle 10.

As indicated with respect to FIG. 5, steel could be one material from which the components are made. Other suitable materials include aluminum and the many rigid plastics now available.

The means for joining the components 26, 28 and 30 together may also be modified, as there are many equivalent fastening devices available. One modification is to pivotally attach shoe 30 to link 28 by a spring loaded device which biases the two together and with cooperating mashing teeth. With this type modification, shoe 30 could be easily ratcheted to a suitable orientation required by the surface against which it would rest.

Further, the fastening means employed can be such as to discourage removal from bicycle 10.

The present invention has been illustrated with one protector 14 being utilized. Clearly, a stand 14 may be positioned on both front forks 12 for insured stability without interfering with the use of the bicycle in any manner whatsoever.

As can be discerned from the foregoing, a protector for preventing the tips of the front forks on a bicycle from encountering the ground when the front wheel has been removed has been disclosed. The protector includes a bracket or the like for being secured to one fork, a shoe for engaging the ground and a link for linking the shoe and bracket together. An advantage of the protector is that it does not interfere with the operations of the bicycle and therefore may be permanently secured to the fork. Another advantage of being fixed to the bicycle is that it does not require a place to store it during the operation of the bicycle. Still another advantage is that it is not easily lost or stolen. Yet another advantage of the protector of the present invention is that it can be incorporated as part of the manufacturing of the bicycle or installed after the manufacture. Another advantage is that the stand may be made in different colors to match the color of the bicycle or the fancy of the user.

I claim:

1. A protector for protecting the front forks of a bicycle by preventing the forks from contacting a ground surface when the front wheel has been removed, said protector comprising:

engaging means for engaging a surface when the front wheel has been removed from the bicycle; and attaching means with one end thereof secured to a single front fork in a non-interfering position both with respect to the use of the bicycle and with the removal and replacement of the front wheel thereof and with another end attached to said engaging means so that said engaging means extend past the front fork and towards said surface.

2. The protector of claim 1 wherein said engaging means includes a plate having a flange along one edge for engaging the ground surface.

3. The protector of claim 1 wherein said engaging means is movably attached to said attaching means.

4. The protector of claim 1 wherein said attaching means include bracketing means for being secured to the front fork.

5. The protector of claim 2 wherein flange is covered by an anti-slip material.

6. The protector of claim 4 wherein said attaching means include linking means attaching said engaging means to said bracketing means.

7. A protector for a bicycle adapted to remain in place and in a non-interfering position both with respect to the use of the bicycle and with the removal and replacement of the front wheel thereof and which prevents the free ends of the front forks from engaging the ground when the front wheel is removed, protector comprising:

a strap secured around a single fork above the free end thereof and having an arm extending outwardly therefrom and normally to the axis of said single fork;

a link having one end attached to said arm and another and extending past the free end of the fork and towards the ground, said link being normally offset relative to the rotational path of the front wheel; and engaging means attached to said another end of said link for engaging the ground when the front wheel has been removed from the bicycle.

* * * * *